United States Patent [19] [11] 3,687,046
Kaneko [45] Aug. 29, 1972

[54] LENS SHUTTER FOR SINGLE-LENS REFLEX CAMERA

[72] Inventor: Katsumi Kaneko, Urawa, Japan
[73] Assignee: Kabushiki Kaisha Koparu, Tokyo, Japan
[22] Filed: July 2, 1971
[21] Appl. No.: 159,181

[30] Foreign Application Priority Data

July 10, 1970 Japan ...................... 45/68913

[52] U.S. Cl. ................................................ 95/63
[51] Int. Cl. ............................................ G03b 9/14
[58] Field of Search .............................. 95/63, 64, 53

[56] References Cited

UNITED STATES PATENTS

| | | | |
|---|---|---|---|
| 3,153,997 | 10/1964 | Rentschler | 95/63 |
| 3,187,654 | 6/1965 | Strap | 95/63 |
| 3,323,433 | 6/1967 | Pelikan | 95/63 |

Primary Examiner—Samuel S. Matthews
Assistant Examiner—Richard L. Moses
Attorney—Cushman, Darby & Cushman

[57] ABSTRACT

A lens shutter for single-lens reflex camera, comprising a sector ring biased in the direction of closing the shutter blades, a shutter opening and closing lever and a closing action lever which are both rotatably mounted coaxially, a spring applied between the shutter opening and closing lever and the closing action lever, a spring for biasing the closing action lever, and a lock lever for locking the shutter opening and closing lever and the closing action lever in their cocked positions, respectively. After the shutter blades are closed first upon release of the shutter mechanism, the sector ring is struck by the shutter opening and closing lever, causing the shutter blades to be opened, and then after the lapse of a predetermined delay time, the sector ring is struck again by the shutter opening and closing lever which is rotated by the closing action lever to thereby close the shutter blades. The shutter opening and closing lever, after its aforesaid action, will assume a position not associated with the sector ring which, in turn, is locked in a position at which the shutter blades are held open. Whereby, a series of opening and closing movements of the shutter blades are accomplished quickly and positively.

4 Claims, 5 Drawing Figures

LENS SHUTTER FOR SINGLE-LENS REFLEX CAMERA

BACKGROUND OF THE INVENTION

1. Field of the Invention

The present invention is concerned with a lens shutter for a single-lens reflex camera, and more particularly, it relates to a mechanism for opening and closing a lens shutter for a single-lens reflex camera of the quick return type.

2. Description of the Prior Art

A lens shutter for a single-lens reflex camera, in general, is required from the aspect of its assignment to function in such a way that, in normal condition, the shutter blades are held in their open position. To this end, the lens shutter of this type requires to be arranged to behave in such a manner that, as the shutter mechanism is released, the shutter blades are closed first before the reflection mirror which is housed within the camera body is leaped up, and then after this reflection mirror has thus been leaped up, the shutter blades are opened and closed to complete the necessary exposure, and furthermore, after the mirror which has been held in its leaped-up position is turned downwardly to shut the light incident to the film, the shutter blades are opened once again. Moreover, the aforesaid series of movements of the lens shutter require to be performed quickly and soundly. On the other hand, known lens shutter mechanism of the aforesaid type are arranged so that the opening and closing movement of the shutter blades is performed by means of a single driving spring. It should be noted, therefore, that such an arrangement of the lens shutter of the prior art has the drawback that the speed of the opening and closing movement of the shutter blades which is necessary for obtaining an exposure in actual photography tends to become slowed down owing to the aforesaid series of preliminary movements, with the result that not only a high speed exposure becomes difficult but also the exposure characteristics per se become inferior.

On the other hand, a lens shutter in general is advantageous for photography using a flash bulb. Therefore, cameras comprising, in combination, a focal plane shutter and a lens shutter are known. This type of camera is arranged so that, in a normal photography, the focal plane shutter is used while the lens shutter is held in its fully open state, whereas in a photography utilizing a flash bulb, the exposure time which is controlled by the focal plane shutter is adjusted in advance so as to be longer than the exposure time which is controlled by the lens shutter in order to complete the exposure by the lens shutter during the period in which the focal plane shutter is held open. It should be noted, however, that as stated above, a camera of this type carries as many as two shutter mechanism. Therefore, camera of this type, the whole some structure of the camera tends to be quite complicated. Not only that, the mechanism with which the focal plane shutter is associated with the lens shutter becomes complicated accordingly, so that the assembling and the adjusting operations of the camera require a number of parts and steps and a lot of labor, resulting in a markedly high cost of manufacture.

SUMMARY OF THE INVENTION

It is, therefore, an object of the present invention to provide a lens shutter for a single-lens reflex camera of the quick return type, in which both the shutter opening and closing lever member and the closing action lever member are rotatably mounted coaxially on a single shaft to be operative so that the opening movement and the closing movement of the shutter blades are performed independently of each other by separate source of force, i.e., one by a spring means applied between the shutter opening and closing lever member and the closing action lever member and the other by a spring means applied to only the closing action lever member, to thereby obtain high speed opening and closing movements of the shutter blades.

Another object of the present invention is to provide a lens shutter for a single-lens reflex camera of the quick return type, which improves the exposure characteristics by arranging so that the shutter blades are opened and closed as the shutter blade opening and closing member is struck by the shutter opening and closing lever member by virtue of the force of the inertia of the latter's movement, and which makes it possible to control an extremely short exposure time.

Still another object of the present invention is to provide a lens shutter for a single-lens reflex camera of the quick return type, which enables the movement for closing the shutter blades immediately before the exposure aperture is opened and closed for the completion of an exposure and the movement for opening the shutter blades immediately after said opening and closing of the aperture for an exposure to be both performed smoothly and quickly, by arranging so that the shutter opening and closing lever member is always located at a position irrelevant to the shutter blade opening and closing member excepting the period in which the lever member is actuated for the sake of an exposure.

Yet another object of the present invention is to provide a lens shutter for a single-lens reflex camera of the quick return type, which can be used in combination with a focal plane shutter so that, in case an exposure is to be performed by the focal plane shutter, the shutter blade opening and closing member is adapted to be held in its position of keeping the blades fully open by means of a locking member mounted on the shutter opening and closing lever member.

Other objects and advantages of the present invention will become apparent from the following detailed description when taken in conjunction with the accompanying drawings.

DESCRIPTION OF THE PREFERRED EMBODIMENTS

Figure 1:
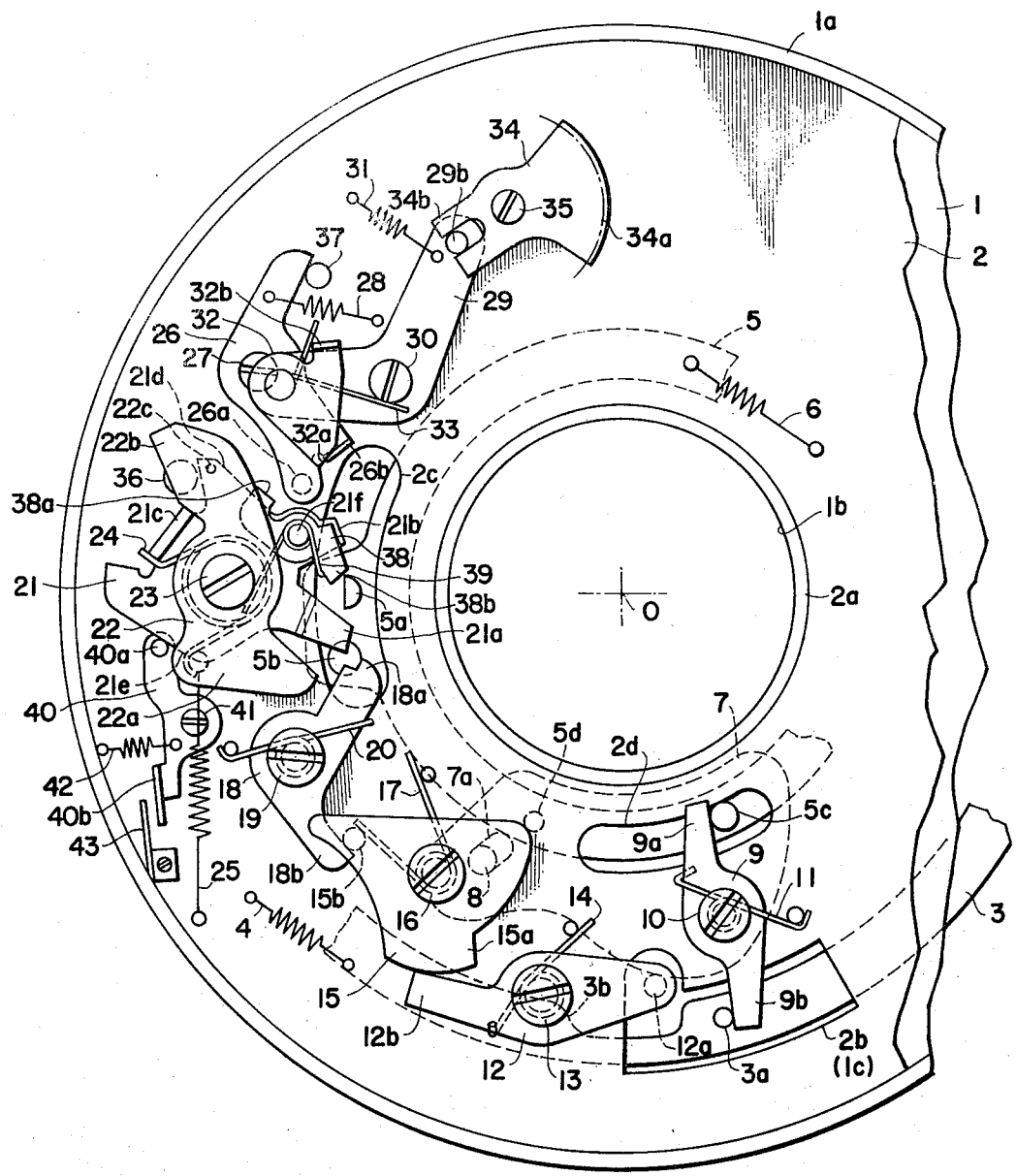
FIG. 1 is a front elevational view, partly broken away, of an embodiment of the lens shutter of the present invention in which the shutter is in its uncocked state.

Description will hereunder be directed to an embodiment of the present invention.

In the drawings, reference numeral 1 represents a known shutter case. This shutter case 1 has an outer peripheral portion 1a, an exposure aperture 1b and an arcuate slot 1c. Numeral 2 represents a base plate of the shutter. This base plate 2 is provided with a lens mount portion 2a which is in register with the exposure aperture 1b, a slot 2b which is of the same shape as that of the arcuate slot 1c and is positioned to face exactly the latter slot 1c, and arcuate slots 2c and 2d. Numeral 3 represents a release operating ring which is provided on the rear side of the shutter case 1 so as to be rotatable about the optical axis 0 and also to be urged to rotate clockwise by a spring 4. This release operating ring 3 has a pin 3a which protrudes into the shutter case 1 after passing through the arcuate slot 1c and through the slot 2b, and also has a cam face 3b. Numeral 5 represents a sector ring which is provided between the shutter case 1 and the base plate 2 in such a way as to be rotatable about the optical axis 0 and to be urged to rotate clockwise by a spring 6. This sector ring 5 has a pin 5a and another pin 5b both of which project into the shutter case 1 after passing through the arcuate slot 2c, and also it has a pin 5c which protrudes into the shutter case 1 after passing through the arcuate slot 2d, and further it is provided with a pin 5d which is assigned to rotate the known shutter blades of which only one blade 7 is shown for the sake of simplicity. The shutter blade 7 is provided with a slot 7a through which is inserted a shaft 8 extending from the base plate 2. As a result, the shutter blade 7 is adapted to close as the sector ring 5 is rotated clockwise in FIG. 1, whereas conversely the shutter blade 7 will open as the sector ring 5 is rotated counter-clockwise in FIG. 1 following the completion of said clockwise movement of same. Numeral 9 represents an intermediate lever which is rotatably mounted on a shaft 10 extending from the base plate 2 and is urged to rotate clockwise by a spring 11. This intermediate lever 9 has an arm 9a which is adapted to be brought into contact with the pin 5c of the sector ring 5 and another arm 9b which is adapted to be brought into contact with the pin 3a of the release operating ring 3. Numeral 12 represents a shutter release locking lever which is rotatably mounted on a shaft 13 extending from the base plate 2 and is urged to rotate clockwise by a spring 14. This shutter release locking lever 12 has a pin 12a which projects beyond the rear side face of the shutter case 1 after passing through the slot 1c and the slot 2b and which is thus adapted to be brought into contact with the cam face 3b of the release operating ring 3, and it also has an arm 12b which is adapted to engage a stepped portion 15a of a shutter releasing lever 15. This shutter releasing lever 15 further has a pin 15b. This lever 15 is rotatably mounted on a shaft 16 extending from the base plate 2 and is urged to rotate counter-clockwise by a spring 17. Numeral 18 represents an open position locking lever which is rotatably mounted on a shaft 19 extending from the base plate 2 and is urged to rotate counter-clockwise by a spring 20. This open position locking lever 18 has a stepped portion 18a and an arm 18b which is adapted to be brought into contact with the pin 15b of the shutter releasing lever 15. Numerals 21 and 22 represent a shutter opening and closing lever and a closing action lever, respectively, both of which are rotatably mounted on a shaft 23 extending from the base plate 2. A spring 24 is applied between these two levers 21 and 22. In addition, a spring 25 is applied to the closing action lever 22. The shutter opening and closing lever 21 has an arm 21a which is adapted to engage the stepped portion 18a of the open position locking lever 18, and another arm 21b which is adapted to be brought into contact with the pins 5a and 5b to cause reciprocating movement of the sector ring 5. The shutter opening and closing lever 21 further has a bent portion 21c, an arm 21d, a cam portion 21e and a shaft 21f. The closing action lever 22, on the other hand, has an arm 22a, another arm 22b which engages the bent portion 21c of the shutter opening and closing lever 21, and a pin 22c. Numeral 26 represents a closed position locking lever which is rotatably mounted on a shaft 27 extending from the base plate 2 and is urged to rotate clockwise by a spring 28. This closed position locking lever 26 is provided with a pin 26a which is adapted to be brought into contact with the arm 21d, and also provided with a bent portion 26b which is adapted to engage the arm 22b. Numeral 29 represents a delay lever which has a shaft 29a and a pin 29b and which is rotatably mounted on a shaft 30 extending from the base plate 2 and is urged to rotate counter-clockwise by a spring 31. Numeral 32 represents a pawl lever having a projection 32a and a bent portion 32b which engages the delay lever 29. This pawl lever 32 is rotatably mounted on the shaft 29a and is urged to rotate clockwise by a spring 33. Numeral 34 represents a sector gear having a toothed portion 34a which meshes with a known delay gear mechanism not shown and also having a forked portion 34b for nipping the pin 29b therebetween. This sector gear 34 is rotatably mounted on a shaft 35 extending from the base plate 2. Numerals 36 and 37 represent stoppers, respectively, both of which are secured to the base plate 2. Numeral 38 represents a locking lever which has a bent portion 38a engaging the shutter opening and closing lever 21 and has a projection 38b and which is rotatably mounted on the shaft 21f of the shutter opening and closing lever 21. This locking lever 38 is urged to rotate counter-clockwise by a spring 39. Numeral 40 represents a contact lever which has a pin 40a adapted to engage the cam portion 21e of the shutter opening and closing lever 21 and has a bent portion 40b adapted to be brought into contact with and to move away from a fixed contact 43 which is fixed to the base plate 2. This contact lever 40 is rotatably mounted on a shaft 41 extending from the base plate 2 and is urged to rotate clockwise by a spring 42.

Description will next be made on the manner in which the aforesaid embodiment of the present invention is operated.

Figure 2:
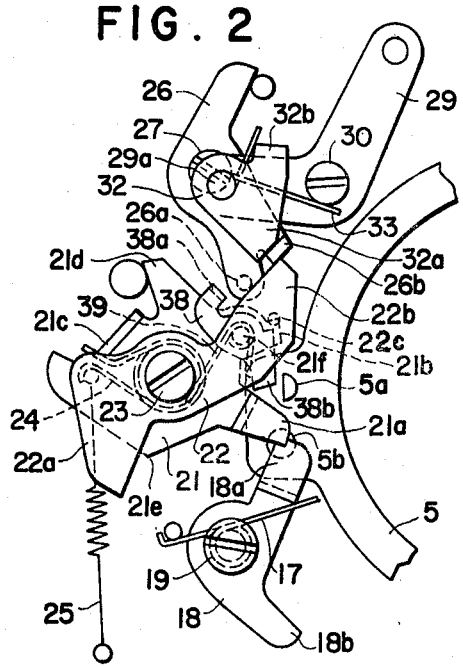
FIG. 2 is a front elevational view of the shutter opening and closing mechanism region when the shutter is in its cocked state.

Description of the operation will be made first on an instance in which the exposure is performed by means of the lens shutter and not by means of the focal plane shutter. In this instance, the focal plane shutter is set, in advance, for a relatively long exposure time. FIG. 1 shows the shutter which is in its state of being uncocked. Let us now assume that the film winding lever not shown is operated when the shutter is in the aforesaid uncocked state. Whereupon, both the shutter releasing lever 15 and the closing action lever 22 are rotated clockwise against the forces of the springs 17 and 25, respectively. During this part of actions, the open position locking lever 18 — which is relieved from its state of being retained by the pin 15b as a result of the rotation of the shutter releasing lever 15 — is rotated counter-clockwise for a small distance by the spring 20 so that its stepped portion 18a engages the tip of the arm 21a of the shutter opening and closing lever 21. On the other hand, this shutter opening and closing lever 21 also is given a force to rotate clockwise via the spring 24. However, because the arm 21a of the lever 21 is in engagement with the stepped portion 18a of the open position locking lever 18, the shutter opening and closing lever 21 is not able to rotate clockwise. As a result, both of the springs 24 and 25 are tensioned. Along therewith, the shutter releasing lever 15 is held in its cocked position owing to the engagement of the stepped portion 15a of the lever 15 with the arm 12b of the shutter release locking lever 12. Also, the closing action lever 22 is kept in its cocked position owing to the action of its arm 22b which first pushes away both the projection 32a of the pawl lever 32 and the bent portion 26b of the closed position locking lever 26 to pass thereby and then returns to engage the bent portion 26b. During this state of the aforesaid parts, the locking lever 38 is rotated clockwise slightly by the pin 22 c of the closing action lever 22 so that the locking lever 38 is positioned outside the path of the pin 5a of the sector ring 5. The essential parts of the shutter opening and closing mechanism in this cocked state are shown in FIG. 2.

Figure 3:
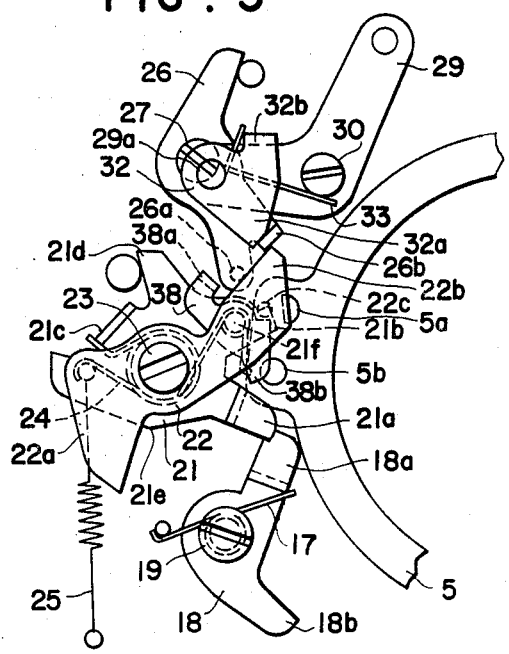
FIG. 3 is a front elevational view of the shutter opening and closing mechanism region when the shutter is in its state of being ready for being opened and closed for exposure.

When it is intended to take a photograph when the shutter mechanism is in the aforesaid cocked state, it is only necessary to depress the shutter release button of the camera not shown. Whereupon, as a first step, the release operating ring 3 rotates counter-clockwise in FIG. 1, while rendering the spring 4 tensioned. During this part of action, the pin 3a pushes the arm 9b. As a result, the intermediate lever 9 is caused to rotate counter-clockwise against the force of the spring 11. Accordingly, the sector ring 5 is rotated clockwise also by the spring 6 to cause the shutter blade 7 to close. The essential parts of the shutter opening and closing mechanism in this stage are shown in FIG. 3.

The counter-clockwise rotation of the release operating ring 3 then works so as to leap up the mirror which is not shown. Thereafter, the rotating release operating ring 3 pushes the pin 12a with its cam face 3b to thereby cause the shutter release locking lever 12 to rotate counter-clockwise against the force of the spring 14. The release operating ring 3 is held in its present position by a locking mechanism not shown. As a consequence, the arm 12b is relieved of its engagement with the stepped portion 15a, so that the shutter releasing lever 15 is rotated counter-clockwise by the spring 17. Along therewith, the shutter releasing lever 15 pushes the arm 18b with its pin 15b, and accordingly, it causes the open position locking lever 18 to rotate clockwise against the force of the spring 20.

In the manner as stated above, the engagement of the stepped portion 18a of the open position locking lever 18 with the arm 21a is relieved. As a consequence, the shutter opening and closing lever 21 is caused to rotate clockwise by the spring 24 having a considerably strong force. During this course of clockwise rotation of the lever 21, the arm 21b which has till then retreated to a position irrelevant to both of the pins 5a and 5b of the sector ring 5 strikes the pin 5b, causing the sector ring 5 to rotate counter-clockwise against the force of the spring 6, and thus the shutter blade 7 is opened. During this part of operation, the focal plane shutter not shown is positioned already in its opened state. Therefore, with said opening movement of the shutter blade 7, an exposure is started. The contact lever 40, on the other hand, is operated by the cam portion 21e of the shutter opening and closing lever 21 in such a way that, when the shutter blade 7 is fully opened, the bent portion 40b of the contact lever 40 is brought into contact with the fixed contact 43 to close the flash circuit not shown to thereby luminesce a flash bulb not shown either.

Figure 4:
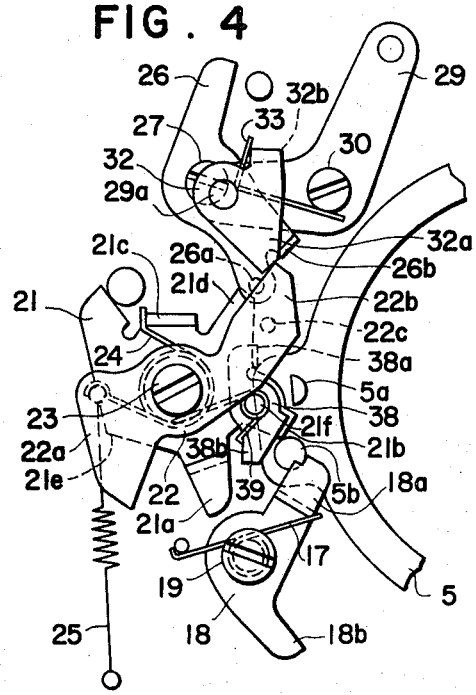
FIG. 4 is a front elevational view of the shutter opening and closing mechanism region when the shutter blades are opened for an exposure.
Figure 5:
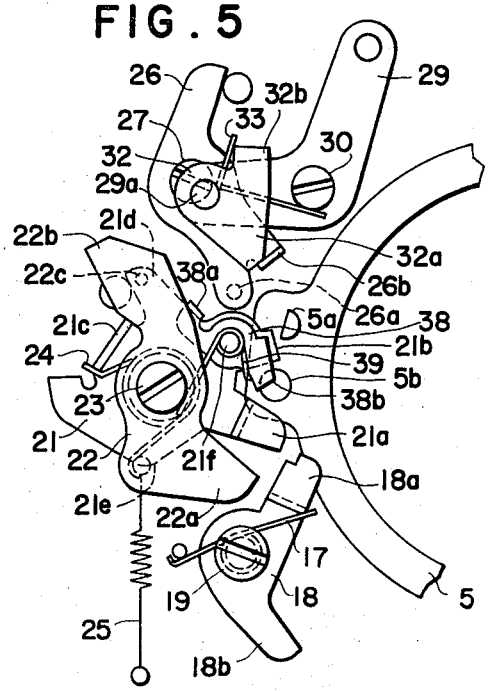
FIG. 5 is a front elevational view of the shutter opening and closing mechanism region, showing the state in which the shutter blades are closed following the completion of the opening and closing movements of the shutter blades for an exposure.

On the other hand, immediately before the shutter blade 7 is fully opened, the arm 21d of the shutter opening and closing lever 21 pushes the pin 26a to thereby cause the closed position locking lever 26 to rotate counter-clockwise against the force of the spring 28. As a result, the bent portion 26b is relieved of its engagement with the arm 22b. Accordingly, the closing action lever 22 tends to rotate counter-clockwise quickly as it is urged by the spring 25. However, this tendency of the lever 22 is temporarily hindered by the engagement of the arm 22b with the projection 32a of the pawl lever 32. This state of the parts is shown in FIG. 4. The position of the projection 32a of the pawl lever 32 has been determined already by teruning the delay lever 29 to a position corresponding to the preset time of exposure, as is well known. Therefore, by a strong force of the spring 25, the closing action lever 22 pushes slowly and steadily the pawl lever 32 starting at the position in which the lever 22 is in engagement with the pawl lever 32. After the lapse of a predetermined delay time, this engagement between these two parts is relieved. Whereupon, the lever 22 is quickly rotated counter-clockwise. As the lever 22 makes this quick counter-clockwise rotation, its arm 22b pushes the bent portion 21c, with the result that the shutter opening and closing lever 21 is also rotated counter-clockwise quickly. During this quick movement of the lever 21, its arm 21b strikes the pin 5a, causing the sector ring 5 to rotate clockwise quickly so that the shutter blade 7 is closed. Accordingly, the sector ring 5 is coercively moved by that shutter opening and closing lever 21 as the latter is caused to make a quick movement by the force of the powerful spring 25, more coercively than in the instance where the sector ring 5 is rotated clockwise by the force of the spring 6. Therefore, the shutter blade 7 can effect an extremely quick closing action. After the shutter blade 7 has been closed in this way, the arm 21b of the shutter opening and closing lever 21 continues to make its movement up to a position which is outside the paths of movement of both pins 5a and 5b. This state of the parts is shown in FIG. 5.

After the shutter blade 7 has completed its opening and closing action for an exposure, the focal plane shutter is closed also. This state is transmitted in the form of a signal to the mirror mechanism by a mechanism not shown, so that the mirror is caused to make a downward pivotal movement. After the mirror has completed its downward movement, the release operating ring 3 is relieved of its locked state by the aforesaid locking mechanism not shown, so that the release operating ring 3 is rotated clockwise by the spring 4. As a result, the intermediate lever 9 is rotated clockwise by the spring 11 to thereby cause the sector ring 5 to be rotated counter-clockwise against the force of the spring 6, so that the shutter blade 7 is opened again to resume its initial position shown in FIG. 1.

Description will next be made on the instance in which an exposure is performed by relying on the focal plane shutter instead of by the lens shutter. In such a case, it is necessary to inhibit the occurrence, due to releasing operation, of the closing action of the shutter blades which have been held open to enable the adjustment of focus. This aim is attained, according to the present invention, by cocking only the focal plane shutter. More specifically, at the time that a photograph is to be taken, the lens shutter is in its state of being uncocked as shown in FIG. 1. Therefore, even when the release opereting ring 3 is rotated counter-clockwise as stated previously by the depression of the release button of the camera and furthermore even when the intermediate lever 9 is rotated counter-clockwise also, the sector ring 5 is not allowed to rotate clockwise since its crescent shaped pin 5a remains to be in engagement with the projection 38b of the locking lever 38, so that the shutter blade 7 will not close. This locking lever 38 is adapted to be placed out of the path of movement of the pin 5a by the pin 22c of the closing action lever 22 only when the lens shutter is cocked. In the manner stated above, the lens shutter is not actuated at all, but the focal plane shutter alone is released, and this latter effects its opening and closing movement in accordance with the predetermined exposure time.

I claim:

1. A lens shutter for a single-lens reflex camera, comprising:

a shutter blade opening and closing member interlocked with the shutter blades and biased in the direction of closing the shutter blades, a shutter opening and closing lever member rotatably mounted on a base plate and provided with an arm portion capable of striking said shutter blade opening and closing member alternately in two directions, one for opening and the other for closing the shutter blades, a closing action lever member rotatably mounted coaxially with said shutter opening and closing lever member and capable of engaging this latter lever member, a spring means applied between said shutter opening and closing lever member and said closing action lever member and arranged so as to bias said shutter opening and closing lever member in the direction of opening the shutter blades whenever the shutter is cocked, a spring means for biasing said closing action lever member to carry with it said shutter opening and closing lever member in the direction of closing the shutter blades whenever said closing action lever member is relieved from its cocked position, a locking lever for locking said closing action lever member at its cocked position and arranged so as to be released of this locking state by said shutter opening and closing lever member whenever this latter lever member is relieved from its cocked position, a pawl lever provided adjacent to said locking lever for locking said closing action lever member at its cocked position instead of by said locking lever whenever this locking lever has relieved said closing action lever member of its cocked position, and a delay lever rotatably mounted on said base plate and arranged so as to be actuated upon the locking of said closing action lever member by said pawl lever and to thereafter relieve the engagement between said closing action lever member and said pawl lever, said shutter opening and closing lever member being arranged so that said arm portion thereof will always assume a position at which it never engages said shutter blade opening and closing member excepting the period in which said shutter opening and closing lever member makes reciprocating movement to effect an exposure.

2. A lens shutter according to claim 1, in which said locking lever is rotatably mounted on said shutter opening and closing lever member to lock said shutter blade opening and closing member at such a position in which the shutter blades are opened, whenever the shutter is at its uncocked position, and to be released from its aforesaid locking state as this locking lever is rotated by said closing action lever member whenever the shutter is cocked.

3. A lens shutter according to claim 1, in which said pawl lever is mounted on said delay lever for rotation only in one direction, and arrangement is provided that the amount of engagement between said pawl lever and said closing action lever member is adapted to be adjusted prior to the release of the shutter mechanism by priorly adjusting the position at which the delay lever is brought into halt.

4. A lens shutter according to claim 1, in which a contact lever for flash circuit is rotatably mounted on said base plate adjacent to said shutter opening and closing lever member and arranged that, whenever said shutter opening and closing lever member rotates to open the shutter blades, said contact lever is rotated by this rotating shutter opening and closing lever member to close said flash circuit.

* * * * *

UNITED STATES PATENT OFFICE
CERTIFICATE OF CORRECTION

Patent No. 3,687,046      Dated Aug. 29, 1972

Inventor(s) Katsumi KANEKO

It is certified that error appears in the above-identified patent and that said Letters Patent are hereby corrected as shown below:

In the heading, read "Foreign Application Priority Data
    July 10, 1970    Japan....45/68913"
as --Foreign Application Priority Data
    July 10, 1970    Japan ...45/68913
    August 5, 1970    Japan ...45/78042 --.

Signed and sealed this 13th day of February 1973.

(SEAL)
Attest:

EDWARD M. FLETCHER, JR.      ROBERT GOTTSCHALK
Attesting Officer             Commissioner of Patents